Sept. 1, 1953      E. C. SURING      2,650,449
FLY ROD AND REEL CASE
Filed Sept. 23, 1949
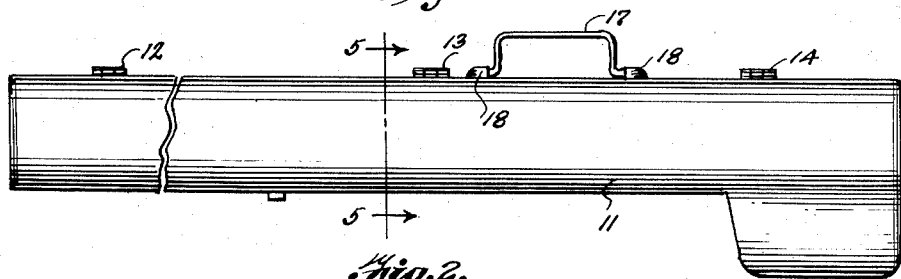
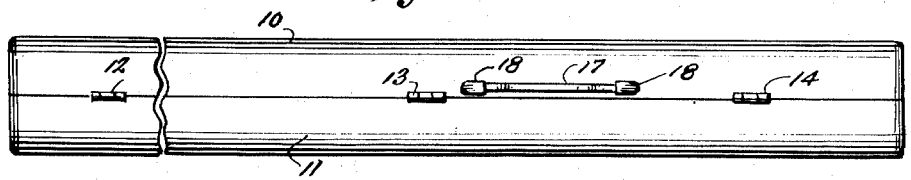
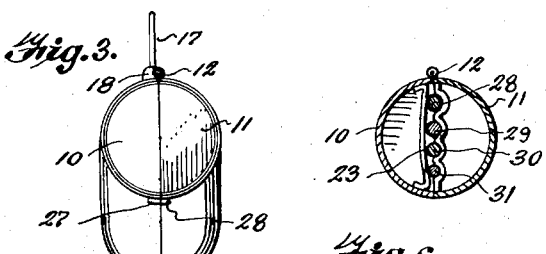
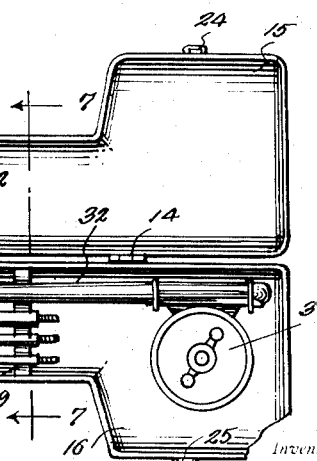
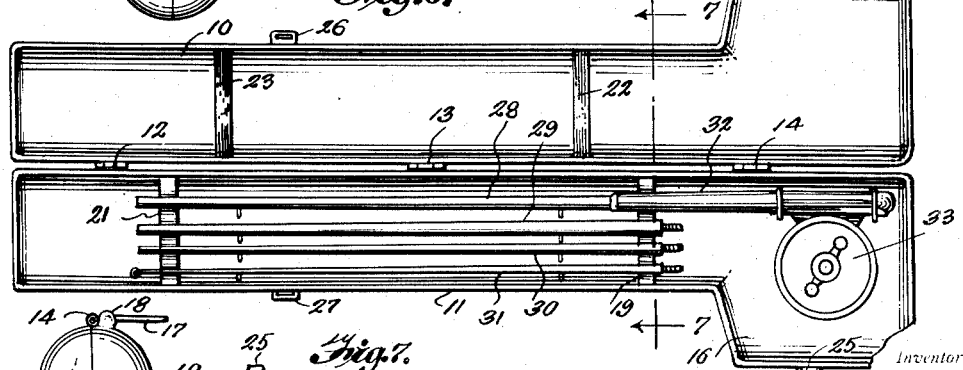
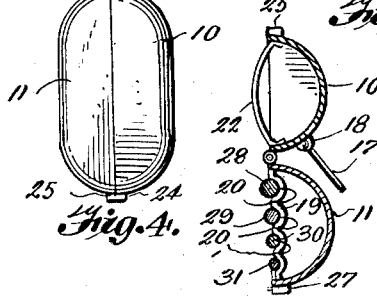
Inventor
EVERETT C. SURING,
By Patrick D. Beavers
Attorneys Patented Sept. 1, 1953

2,650,449

UNITED STATES PATENT OFFICE 2,650,449

FLY ROD AND REEL CASE

Everett C. Suring, Gillett, Wis.

Application September 23, 1949, Serial No. 117,445

1 Claim. (Cl. 43—26)

The present invention relates to a fly rod and reel case and it consists in the combinations, constructions and arrangements of parts herein described and claimed.

Generally the invention comprises a case wherein may be stored the sections of a fly rod together with a reel and line attached to such rod thereby eliminating the necessity for having a separate case for the reel and a separate case for the rod in knocked down condition. The case contains several novel features.

It is accordingly an object of the invention to provide a device of the character set forth wherein may be mounted a knocked down fly rod with reel attached thereto.

Another object of the invention is the provision of a device of the character set forth having a novel rack for the reception of sections of a fly rod.

A further object of the invention is the provision of a device of the character set forth which is simple in construction, inexpensive to manufacture and yet effective and efficient in use.

Other and further objects of the invention will become apparent from a reading of the following specification taken in conjunction with the drawing, in which:

Figure 1 is a side elevational view of an embodiment of the invention,

Figure 2 is a plan veiw thereof,

Figure 3 is an end elevational view of the device shown in Figure 1 taken from one end thereof, Figure 4 is a view similar to figure but taken from the other end thereof, Figure 5 is a sectional view taken along line 5—5 of Figure 1, Figure 6 is an elevational view of the device shown in open condition, and Figure 7 is a sectional view taken along line 7—7 of Figure 6.

Referring more particularly to the drawing, there is shown therein a fly rod and reel case having an elongated hollow body 10 and a complementary cover 11 hinged thereto along the upper edges thereof, as indicated at 12, 13 and 14.

At one end of the body there is provided an integrally formed enlarged portion 15 and the cover 11 is provided with a like enlarged portion 16 which is complementary to the portion 15.

A carrying handle 17 is pivotally mounted in a pair of brackets 18 affixed adjacent the upper edge of the body 10. Transversely extending across the interior of the cover 11 adjacent the enlarged portion 16 is a flat metal rack 19 which is convoluted to provide recesses 20 and adjacent the other end of the cover 11 is a like convoluted transverse member 21.

Transversely extending across the interior of the body 10 adjacent the members 19 and 21 but not coinciding therewith are flat springs 22 and 23.

A latch member 24 is provided upon the lower end of the enlarged portion 15 and a coacting latch member 25 is mounted upon the lower end of the enlarged portion 16. A latch member 26 is mounted upon the lower end of the main portion of the body 10 and a coacting latch member 27 is mounted upon the lower end of the main portion of the cover 11.

In operation, it will be apparent that a fly rod may be disassembled into its progressively smaller sections 28, 29, 30 and 31 and that the same may be laid within the recesses 20 provided for the reception thereof in the racks 19 and 21 and that the handle 32 of the rod will extend into the upper end of the enlarged portion 16 of the cover 11 and that the reel 33 may be allowed to remain upon the handle 32 and will be received in the enlarged portion 16 of the cover 11. The cover 11 and the body 10 may then be brought together whereupon the spring members 22 and 23 will bear against the rod sections 28, 29, 30 and 31 to hold the same rigidly in the racks 19 and 21, the spring members 22 and 23 yielding inwardly during this action. The latch members 24 and 25 and 26 and 27 will then coact in conventional manner to retain the body 10 and cover 11 together after which the entire device may be carried from place to place by means of the handles 17.

While the reel 33 illustrated in the drawing is a fly rod reel, it will be understood that the enlarged portions 15 and 16 may be made of a slightly larger size to accommodate a spinning reel which is slightly greater in size than the reel illustrated.

While but one form of the invention has been shown and described herein, it will be readily apparent to those skilled in the art that many minor modifications may be made herein without departing from the spirit of the invention or the scope of the appended claim.

What is claimed is:

A device of the character described comprising an elongated hollow body, a complementary cover hinged to said body, said body having an enlarged portion at one end thereof, said complementary cover having a complementary enlarged portion at the corresponding end thereof, and means within said body for storing a disassembled fly rod and an attached reel, said means including a pair of transversely extending racks each having a plurality of registering recesses of progressively smaller size extending from one side of said body to the other for the reception in spaced parallel relation of the disassembled parts of the fly rod, said racks being adapted to receive opposite end portions of said disassembled rod, and a pair of transversely extending outwardly bowed flat springs in said cover for holding the rod parts in said racks, said springs each being mounted immediately inwardly of one of said racks, and said springs and said racks being out of registry with one another.

EVERETT C. SURING.

References Cited in the file of this patent

UNITED STATES PATENTS

| Number | Name | Date |
|---|---|---|
| 862,691 | Alexander | Aug. 6, 1907 |
| 1,334,616 | Kristen | Mar. 23, 1920 |
| 1,927,110 | Bannister et al. | Sept. 19, 1933 |
| 2,149,087 | Fisher | Feb. 28, 1939 |
| 2,371,578 | Badger et al. | Mar. 13, 1945 |
| 2,420,347 | Baldwin | May 13, 1947 |
| 2,424,593 | Testi | July 29, 1947 |
| 2,446,715 | Muros | Aug. 10, 1948 |
| 2,511,710 | Hetzler et al. | June 13, 1950 |
| 2,519,662 | Kempken | Aug. 22, 1950 |
| 2,572,706 | Eichholz et al. | Oct. 23, 1951 |